O. PETERMANN.
KEYBOARD FOR TYPE WRITING MACHINES.
APPLICATION FILED JUNE 12, 1909.
1,081,140.
Patented Dec. 9, 1913.
4 SHEETS—SHEET 2.
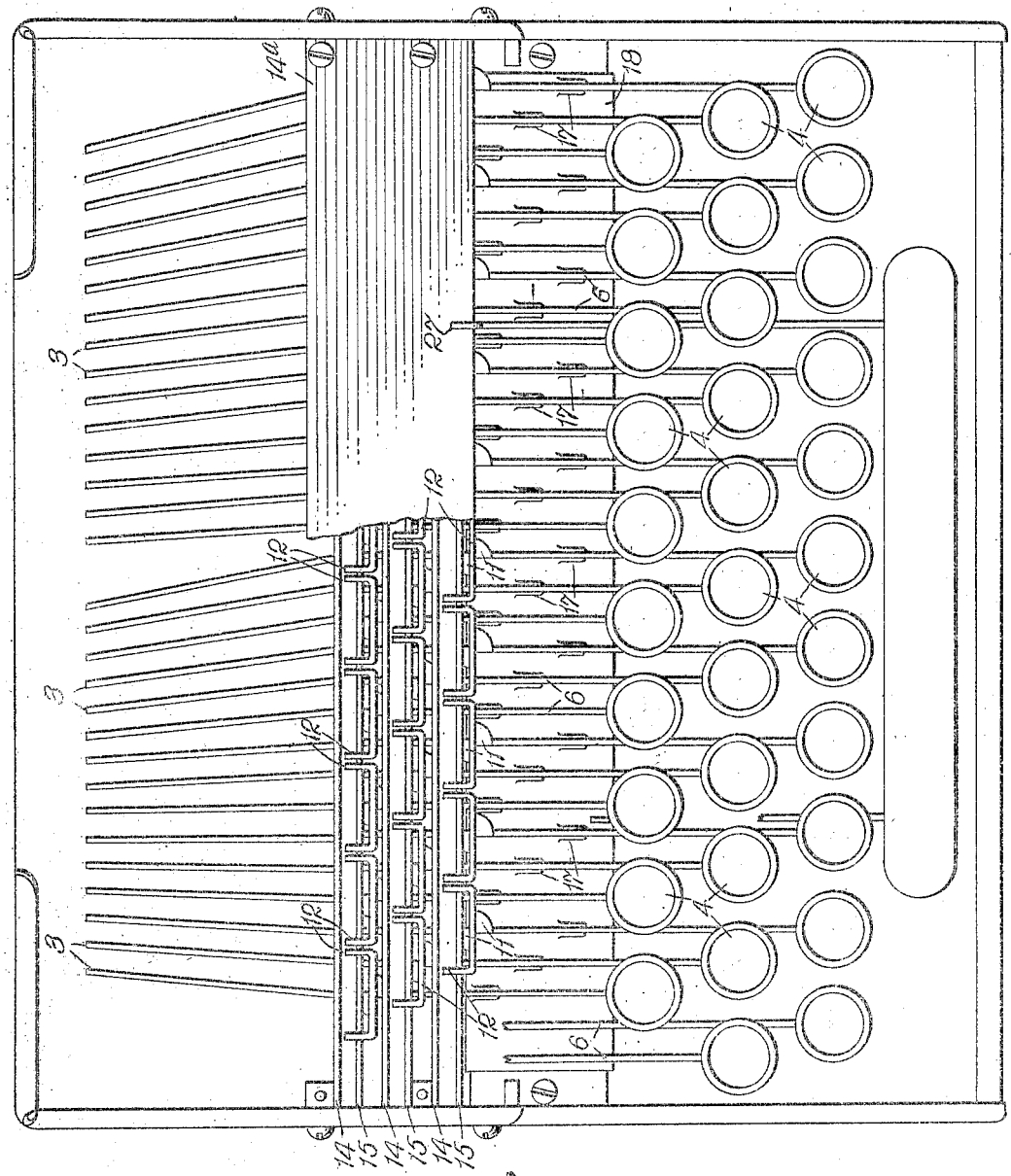
WITNESSES
INVENTOR
Otto Petermann
BY
Criswell & Criswell
ATTORNEYS

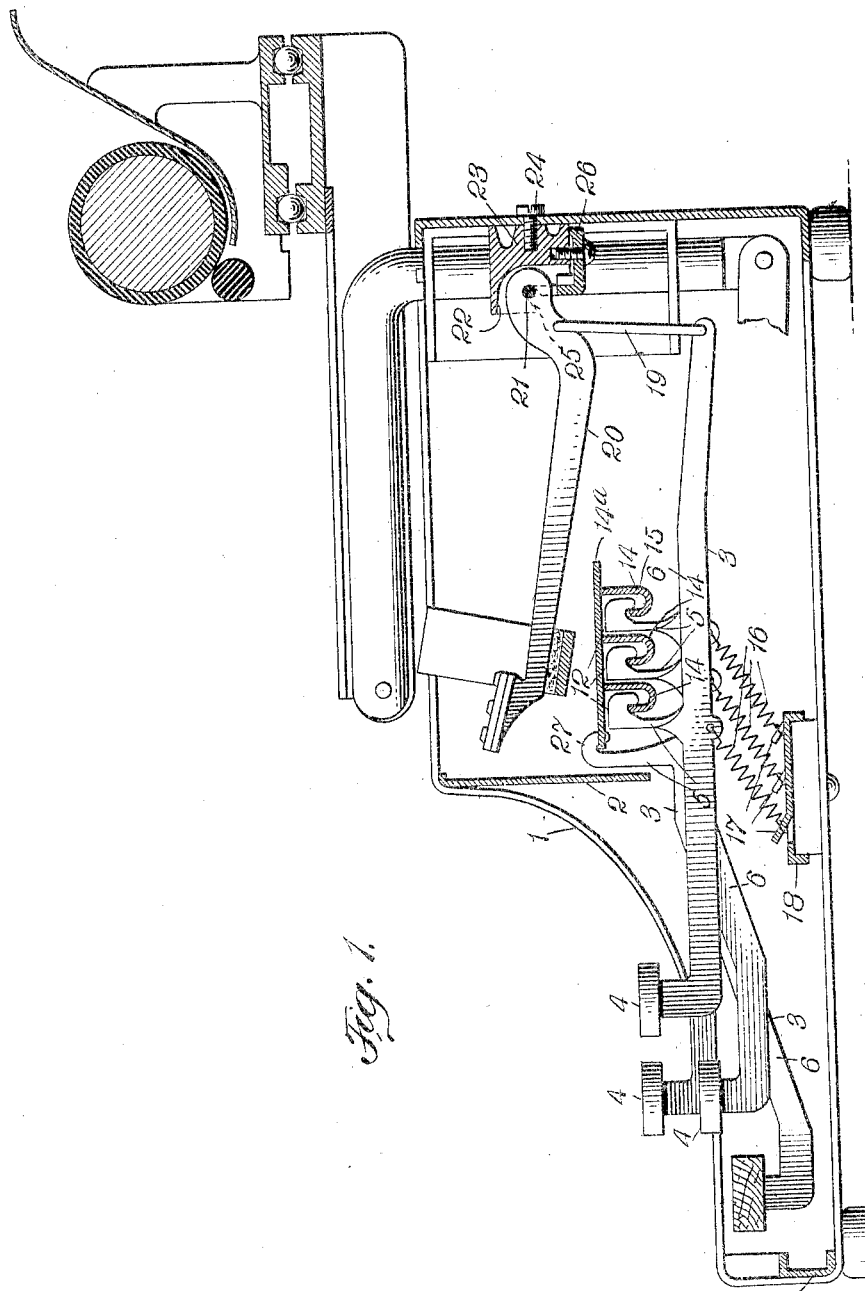

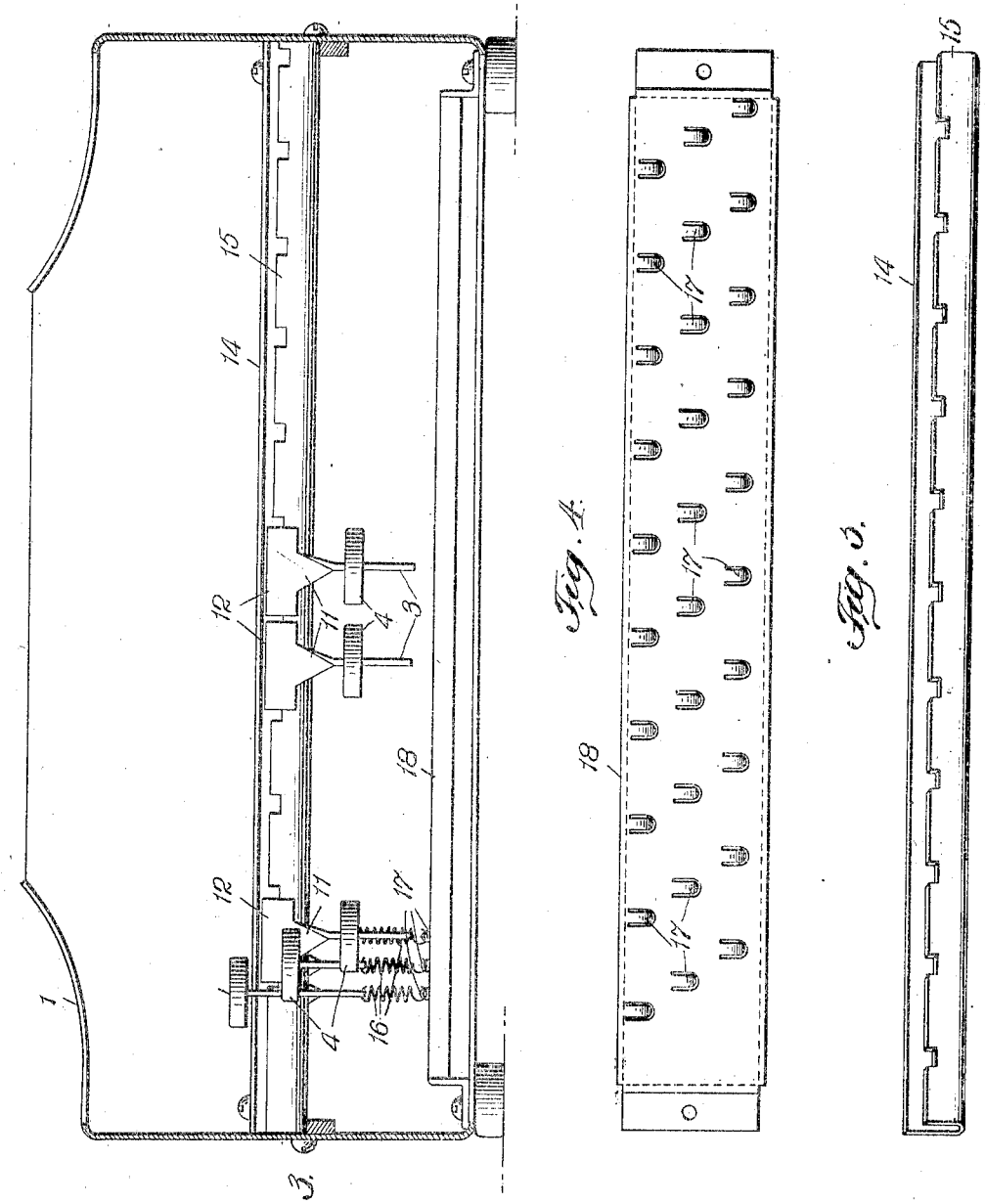

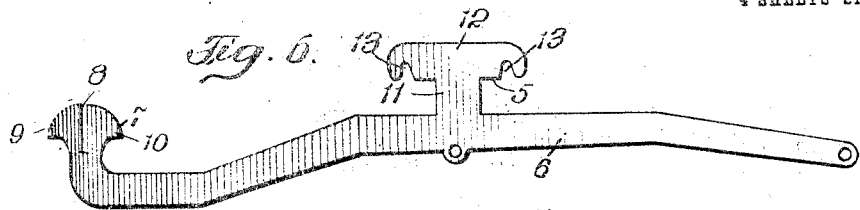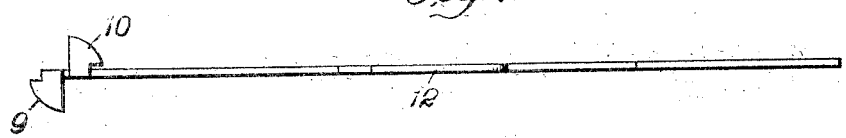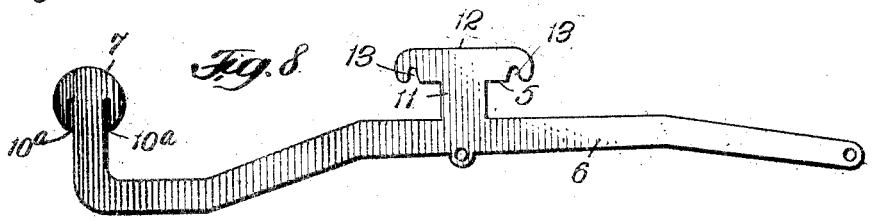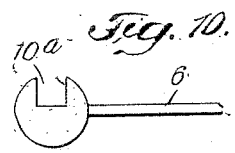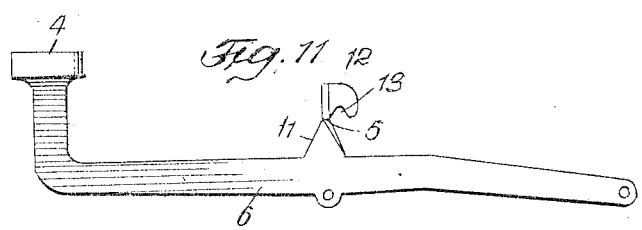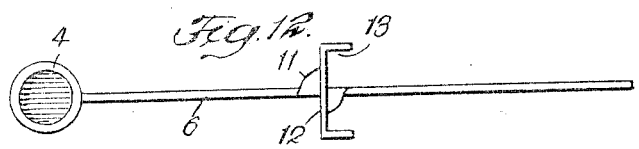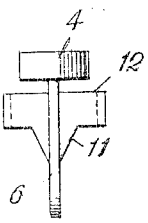

UNITED STATES PATENT OFFICE.

OTTO PETERMANN, OF NEW YORK, N. Y., ASSIGNOR, BY MESNE ASSIGNMENTS, TO STANDARD TYPEWRITER COMPANY, A CORPORATION OF NEW YORK.

KEYBOARD FOR TYPE-WRITING MACHINES.

1,081,140.  Specification of Letters Patent.  Patented Dec. 9, 1913.

Application filed June 12, 1909. Serial No. 501,853.

*To all whom it may concern:*

Be it known that I, OTTO PETERMANN, a citizen of the Republic of Switzerland, and a resident of New York, county and State of New York, have invented certain new and useful Improvements in Keyboards for Type-Writing Machines, of which the following is a full, clear, and exact description.

This invention relates more particularly to keyboards of a foldable front strike typewriting machine such as disclosed in the patent to F. S. Rose, No. 754,242, dated March 8, 1904.

The primary object of the invention is to provide simple and efficient key-levers and means for supporting said key-levers and other elements of a keyboard for typewriting machines.

A further object of the invention is to provide key-levers which have substantial bearings and which are arranged to be suspended from a support, and which key-levers may be each made of a single piece.

With these and other objects in view, the invention will be hereinafter more particularly described with reference to the accompanying drawings, which form a part of this specification, and will then be pointed out in the claims at the end of the description.

In the drawings, Figure 1 is a longitudinal section, partly in elevation, of one form of machine embodying my invention. Fig. 2 is a plan view, partly broken away, showing one arrangement of the key-levers and elements. Fig. 3 is a fragmentary transverse section, showing in front elevation, the key-levers and supporting means therefor. Fig. 4 is a detail plan of the plate or member to which the key-lever springs are attached. Fig. 5 is a detail view of one of the members for supporting the key-levers. Figs. 6 and 7 are detail views of one form of key-lever blank. Figs. 8 to 10 show a lever substantially the same form as in Figs. 6 and 7, except that the end for the finger piece is different; and Figs. 11 to 13 show the key-levers after the blanks have been properly shaped.

The metallic frame 1, Figs. 1 to 3, of the machine is constructed and arranged in any suitable manner, and may consist of side members and an integral back member with an intermediate transverse horizontal bar 2 suitably fastened to the sides of the frame and serving as a brace therefor, and a second transverse bar 2ª at the front of the machine, the whole frame being constructed of sheet metal with rounded edges for the purpose of making the frame light and strong.

The key-levers 3, Figs. 6 to 8, may have finger pieces or keys 4, and are each provided intermediate its ends with an upwardly-extending part 5. This part 5 may be integral with the body portion 6, and the whole lever may be stamped from sheet metal or other material for strength and cheapness. The levers are first stamped or otherwise made in the form shown in Fig. 6, in which the support 7 for the finger pieces 4, and the part 5 lie in the same vertical plane as the body portion 6, and by means of dies or otherwise, the support 7 is bent at right angles to the body portion 6, so as to extend on opposite sides of the upper edge of the key-levers and in a horizontal plane. This support 7 is slotted at 8, Fig. 6, so as to form two members 9 and 10, so that when said members 9 and 10 are bent downward as shown in Fig. 7, one member will extend on one side of the body portion 6 and the other on the opposite side of said body portion, thus forming a substantial and proper support for each finger button, key or piece, though if desired the support may be formed as shown in Figs. 8 to 10, in which the support is slotted at 10ª and then bent to the position shown in Figs. 9 and 10.

The upwardly-extending part 5 of each key-lever is formed with a shank or portion 11, and is substantially T-shaped to provide a head or suspending member 12. This head or member is under-cut to provide two notches 13. When the lever is finished, the head 12 is forced transversely of the body portion 6, and its outer ends bent to make said head substantially U-shaped when viewed from above, so that said levers may be readily and quickly hung or supported from a plurality of transversely-extending bars or members 14. These bars are located under and extend downward from the transverse bar 14ª and are held between the sides of the machine frame, as shown best in Figs.

1 and 2. The levers 3, have their heads 12 of such width that they may rest against each other in series according to the number of bars or members 14. As shown there are three bars 14, and each bar is provided with an upwardly turned or hooked edge 15 which is adapted to fit in the notches 13 of the key-levers 3, so that said levers will be supported on substantially a knife edge and at two points some distance to each side of the body portion 6.

Each key-lever 3 is provided with an aperture on its under side in which is adapted to be fastened one end of a spring 16, the other end of said spring being held to a projecting part 17 stamped or forced from a transverse bar or plate 18 at the lower part of the machine, whereby the said levers may be restored to their normal position. The inner ends of the levers are provided with an aperture in which one end of a link 19 is held, the outer end of said link being pivotally held to a type-bar 20, there being a type-bar for each key-lever. These type-bars are each pivoted at 21, Fig. 1, in a slotted part 22 of a transversely-extending and curved bracket or bar 23 which is held to the rear of the machine frame by means of screws 24 or otherwise. This bracket or bar 23 may be made in a solid piece, and each type-bar has its pintle held in a slot or recess 25 and is normally held against removal by means of an angular bar or device 26. The space-bar, or any other of the levers, may be pivoted to the plate 14$^a$, in which case a part 27 is provided, Fig. 1, which is adapted to enter an opening in said plate to serve as a pivoting means for the space-bar.

While I show and describe a special form of type-bar support and means whereby the type-bars may be detachably held to said support, said features are not claimed herein as they form part of my application Sr. No. 501,849, filed June 12, 1909.

From the foregoing it will be seen that a simple and efficient key-board is provided in which each key-lever has means for pivotally suspending the same; that each key-lever may be made and stamped as a single piece; that each key-lever has a wide and substantial bearing; that simple and efficient means are provided for supporting the levers; and that simple means is provided for restoring the levers to their normal position.

Having thus described my invention, I claim as new and desire to secure by Letters Patent:—

1. In a typewriting machine, the combination of a key-lever, a bearing bar attached thereto and extending from opposite sides thereof, knife-edged bearings carried by the bar, and a support for said bearing bar.

2. In a typewriting machine, the combination of a key-lever, a bearing plate having grooves, a bearing bar attached to the key-lever and having knife-edged bearing portions arranged in said grooves.

3. In a typewriting machine, the combination of a base plate, a grooved bearing plate secured thereto, a series of key-levers, and bearing bars connected with the key-levers having knife-edged bearing portions arranged in the grooves on opposite sides of the key-levers.

4. In a typewriting machine, the combination with a transverse bar extending across the machine and having its ends mounted in the sides thereof, of key-levers having suspension members, and hooked members on said transverse bar for suspending said levers in sets.

5. In a typewriting machine, the combination with a transverse bar extending across the machine, of a plurality of supports having upwardly curved lower edges, and key-levers suspended from the curved edges of said supports.

6. In a typewriting machine, the combination with a transverse bar having its end supported in the sides of the frame of the machine and provided with depending hook-shaped supports, together with key-levers having hook-shaped vertical projections engaging the hook-shaped supports on the transverse bar.

7. In a typewriting machine, the combination of hook-shaped supports, and key-levers having hook-shaped suspension members engaging said supports.

8. In a typewriting machine, a key-lever provided with means including a vertically and laterally projecting hook-shaped member for pivotally and loosely suspending it in operative position.

9. In a typewriting machine, a key-lever having a body portion provided with an integral, transversely extending and vertically projecting hook-shaped member for pivotally supporting it in operative position.

10. In a typewriting machine, a key-lever having its body formed of a single piece and provided at one end with a laterally extending finger button support, and also provided with a projecting and transversely extending member having its under side slotted to pivotally support the lever.

11. In a typewriting machine, a transverse bar supported at its ends on the sides of the frame of the machine, and a space-bar having levers provided with vertical hook projections in pivotal engagement with said transverse bar.

12. In a typewriting machine, a transverse bar and a space-bar having two levers provided with vertical hook pivotal portions in engagement with said transverse bar.

13. In a typewriting machine, a key-lever made of sheet metal having a body portion provided with an upwardly-extending member extending transversely thereof, said member being substantially U-shaped and having notches on the under side thereof for suspending purposes, and a finger-piece support at the outer end of the body portion.

14. In a typewriting machine, a key-lever made of sheet metal having a body portion provided with an upwardly-extending head extending transversely thereof, said head being substantially U-shaped and having notches on the under side of said head thereof for suspending purposes.

15. In a typewriting machine, a key-lever made of sheet metal having a body portion provided with an upwardly-extending member extending transversely thereof, said member having means for suspending purposes, and a finger piece support located at the end of the body portion.

16. In a typewriting machine, the combination with a plurality of transversely-extending bars each having a hooked depending member, of a plurality of key-levers arranged in sets and each key-lever being provided with a suspending portion extending transversely of the body portion thereof and having means for engaging the hooked member of said transverse bars.

17. In a typewriting machine, the combination with a plurality of transversely-extending bars each having a hooked depending member, of a plurality of key-levers arranged in sets and each key-lever being provided with means for engaging the hooked member of said transverse bars.

18. In a typewriting machine, the combination with a plurality of key-levers, of means for loosely suspending said key-levers, a plate extending transversely of the machine and having engaging parts stamped therefrom within the marginal edges thereof, and springs connected at one end to said engaging parts and to the key-levers at a point to one side of the suspending means tending normally to force their outer ends upward.

19. In a typewriting machine, the combination with a plurality of key-levers, of substantially U-shaped bars for suspending said key-levers, a plate extending transversely of the machine and having engaging parts, and springs connected at one end to said engaging parts and to the key-levers.

20. In a typewriting machine, the combination with a fulcrum, of a plurality of key-levers each having, intermediate its ends and located above and extending laterally of the body of said lever, means for pivotally and loosely engaging said fulcrum for suspending said key-levers, a stationary member, and springs connected at one end to said key-levers and at the other end to the stationary member and tending normally to force the outer ends of said key-levers upward.

21. In a typewriting machine, the combination with a plurality of key-levers, of means for pivotally and loosely suspending said key-levers, a plate extending transversely of the machine and having projecting parts stamped therefrom within the marginal edges of said plate, and springs connected at one end to said projecting parts and to the key-levers at a point to one side of the pivoting means tending normally to force their outer ends upward.

22. In a typewriting machine, the combination with a plurality of key-levers, of means for supporting said levers, a plate extending transversely of the machine and having engaging parts stamped therefrom within the marginal edges thereof, and springs connected at one end to said engaging parts and to the key-levers at the other end thereof.

23. In a typewriting machine, the combination with a plurality of key-levers, of means for supporting said levers, a plate extending transversely of the machine and having angularly extending integral engaging parts stamped therefrom within the marginal edges thereof, and springs connected at one end to said engaging parts and to the key-levers at the other end thereof.

This specification signed and witnessed this 4th day of June A. D. 1909.

OTTO PETERMANN.

Witnesses:
M. A. TOWNER, Jr.,
C. BARTELS.